Patented May 29, 1951

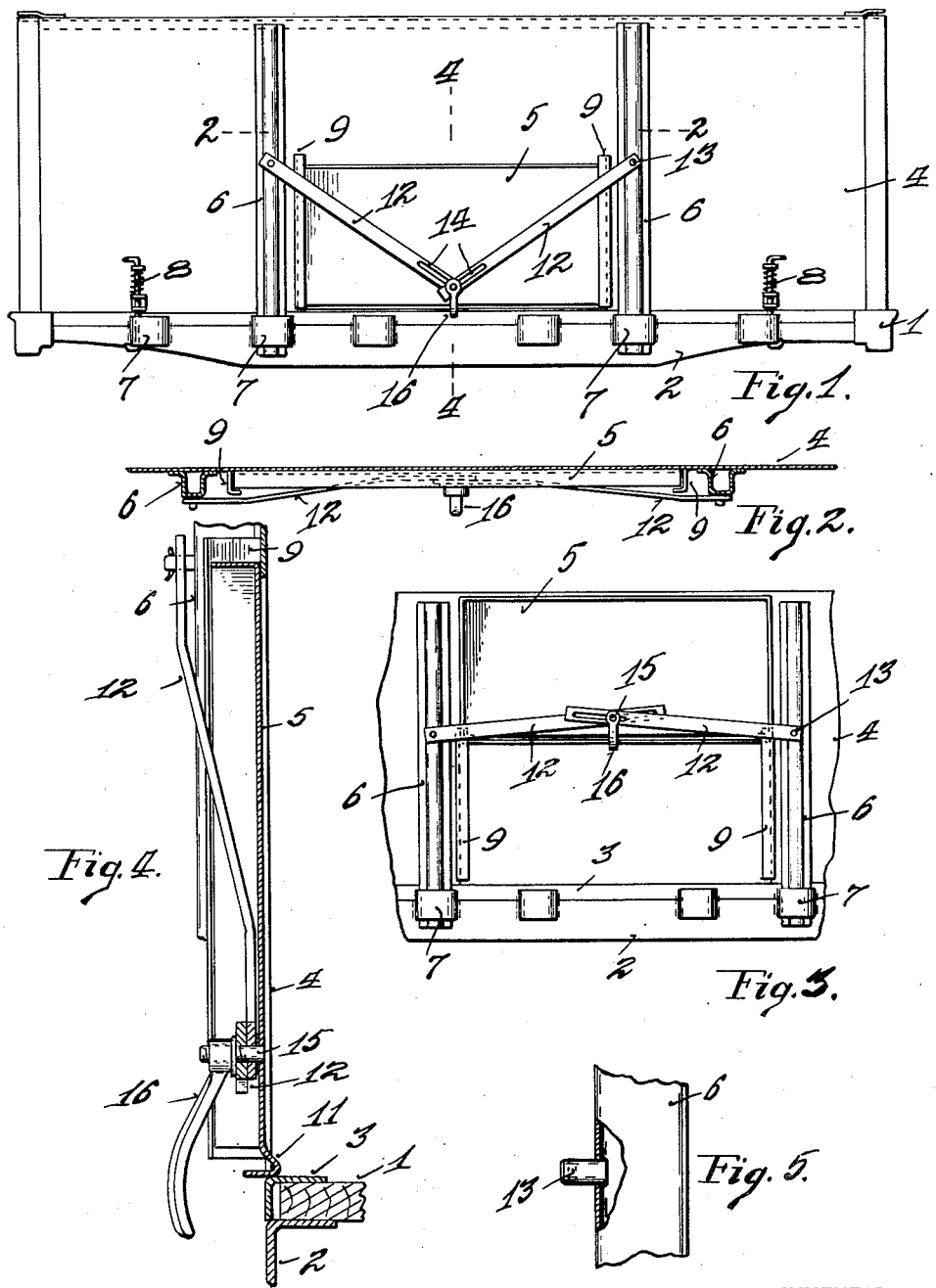
May 29, 1951     H. E. KRUGER     2,555,288
GATE FOR BOX TYPE VEHICLE BODIES
Filed March 27, 1947

2,555,288

UNITED STATES PATENT OFFICE 2,555,288

GATE FOR BOX TYPE VEHICLE BODIES

Henry E. Kruger, Galion, Ohio, assignor to The Perfection Steel Body Company, Galion, Ohio, a corporation of Ohio Application March 27, 1947, Serial No. 737,552

1 Claim. (Cl. 296—15)

This invention relates to improvements in sliding doors or closures for discharge openings in the side and end panels or tail gate of a cargo carrying vehicle or truck body of a receptacle or box type.

The invention is particularly directed to a door or closure for a restricted discharge opening in the rear end panel of a box type of vehicle body, the opening having a greater width span and heighth than ordinarily provided for an auxiliary chute opening in a tail gate of dumping truck bodies. The vehicle, of a four wheel trailer class, is primarily contemplated for farm service with the body readily convertible from a flat platform type to a receptacle type or other types and as a receptacle or box type adaptable for transporting grain or the like products.

The body is of light weight structure with removable sheet metal sides and end panels having their upper and lower ends flanged longitudinally thereof for increased stability and rigidity and having stakes mounted thereupon for removably sustaining the panels upon a platform of the body. The rear end panel is provided with a discharge opening and a slidable door or closure therefor with the structure of the door and the method for slidably mounting the same upon the panel materially strengthening and reinforcing the panel both vertically and laterally about the discharge opening, permitting the panel and door to be made of comparatively light gauge sheet metal for a reduction in its production cost and weight. The reduction in the weight of the panels facilitates in their handling for installation and removal from the body platform in converting the body from one type to another.

Therefore an object of the invention is to provide a vehicle box body forming panel or wall with a discharge opening and a door or closure therefor, the door slidably mounted and supported for a partial or full opening regulating and adapted to be locked in its closed or any adjusted position, of simple and durable construction, easily operated, reinforcing and adding stability to the panel or wall, capable of sustaining heavy load bearing pressure thereagainst without flexing or bulging the door or portion of the panel above the discharge opening thereof.

Another object is to provide an improved panel for a vehicle box type body having a discharge opening therein covered by a sliding door, of extremely durable construction which can be readily and economically fabricated from standard metal plate or sheet bar stock and in which the door is non-removably confined upon the panel in the panel erected or stationed position upon the platform of the body.

Another object is to provide a simple and effective means for a vertically slidable door, as a closure for a discharge opening in a wall or panel of a box type vehicle body, to withhold the door against movement in its closed position and to securely sustain the same in either a partially or fully open position.

Various other features and advantages of the invention will be more fully set forth and apparent from the following description of a preferred embodiment as illustrated by the drawings accompanying and forming a part of this specification, in which:

Figure 1 is an elevation of the rear end of a vehicle box body and the door of the present invention, a closure for a discharge opening in the panel or wall of the box of the body.

Figure 2 is an enlarged section taken on line 2, 2, Figure 1.

Figure 3 is an elevation similar to Figure 1 of a portion of the rear end of the vehicle box body with the door in an elevated or fully open position.

Figure 4 is an enlarged section taken on line 4, 4, Figure 1.

Figure 5 is an enlarged side elevation partly in section of a portion of one of the stakes for mounting and sustaining the rear panel or wall of the box upon the platform of the body having a stud fixed to and projecting therefrom for pivotally mounting an end of a link of the door locking means.

As the general detail of construction of the vehicle body convertible from a receptacle type to a flat or other type is separate and distinct and forms no part of the present invention complete illustration and detail description thereof is herein omitted except in so far as may be pertinent to fully and clearly exemplify the construction and mode of operation of the door or closure for a discharge opening, as for example in the rear end wall or panel of a box of the body removably mounted upon the body platform.

Referring to the drawings I indicates the platform of the body preferably comprising a pair of side rails, one respectively for each of the opposite longitudinal ends of the platform. Each side rail is of a cross-sectional shape for interengagingly receiving a relative end of each of a plurality of determinately spaced bolsters extending cross-wise of the platform and permanently fixed to the side rails. The bolsters support the flooring of the platform, which, following the general practice, consists of wood boards or planks extending longitudinally of the platform.

A bolster 2, respectively for each of the opposite ends of the platform has its web portion outward and in registry with the relative ends of the side rails and its outer plane surface flush with a relative end of the flooring which is capped by an angle bar or rail 3, welded or otherwise fixed to the top side of the bolster, upon which it is superposed.

The side and end walls of the box form of body comprise sheet metal panels and characteristically follow the construction of the panel 4 for the rear end of the box body. The upper and lower ends of the sheet metal panel are laterally flanged longitudinally thereof to reinforce and stiffen the same. The upper flange terminates with a right angle bend extending inwardly of the panel and thence downwardly for additional reinforcement and rim finish. For the rear end panel of the box, the upper rim flange extends inwardly of the body and therefore reversely from the panels for the opposite side and front end of the box body, so as not to be obstructive or limiting to the elevation of a sliding door 5, as a closure for a discharge opening centrally of the panel.

The panel has a plurality of stakes 6 extending vertically or crosswise thereof, fixed upon its outer side, two being sufficient for the rear end panel of the box, having their lower ends projecting from the panel for engagement, each into a relative socket formed by a stake bracket 7, welded or otherwise fixed upon the outer side of the bolster 2, for removably mounting the panel upon the platform.

The panel is preferably anchored to the platform by several hook headed bolts or fastener rods 8, each slidably mounted within a bracket fixed to the panel with its shank traversing a socket formed by a stake bracket 7 and the head end engaged with the bracket.

The stakes 6, preferably are of pressed plate structure, each of a cross-sectional shape to provide a central channel shaped rib longitudinally of the stake projecting from the base flanges at relatively opposite sides of the rib. As a stake is located respectively at each of the opposite sides of the discharge opening in the panel, they provide supports, each for pivotally mounting an end of a link of a pair of links in toggle arrangement connecting with the door for an elevating and locking control thereof.

The margins of the sheet metal panel at each of the opposite sides of the discharge opening and off-set from the opening edge thereof, are reinforced each by an angle iron strip 9, of a length in excess of the heighth of the opening and fixed to the outer side of the panel, and with the margin provides a vertical channel guideway for sliding door 5. The door 5 is of sheet metal structure with a marginal portion for the top and opposite sides bent at right angles to provide a flange rim extending from the outer face side of the door. The lower end of the door body is formed with a return bend 11 having the loop portion of the bend projecting from the inner side of the door body and beyond the inner plane of the panel, normally as a rest for the door, bearing upon the cap rail 3 of the platform and alternately to serve as a stop to limit door elevation by engaging against the edge of the panel forming the top of the discharge opening, and prevent door withdrawal from the panel while the panel is sustained upon the platform. This necessitates insertion of the door into the slideways for its application upon the panel before positioning the same upon and anchorage to the platform.

The door is elevated and locked in either its closed or elevated position partially or fully open by a pair of links 12, 12, in toggle arrangement extending beyond the opposite sides of the door, each having its extended end pivotally mounted upon the panel, as upon a stud 13, welded to and projecting from the rib of a stake 6, and secured against removal from the stud by a cotter pin traversing an aperture in the outer end of the stud.

The opposite ends of each of the links cross each other centrally of the door and each is provided with an elongated slot 14 which is traversed by a screw threaded stud 15 fixed to and projecting from the door, medially of its width and toward the bottom of the door.

A handle 16 has a hub end screw threaded upon the stud 15, providing a hand hold for moving the door and for binding the links to the door against movement, thereby either locking the door in its closed position or sustaining the same in any adjusted open position. The elongated slot in each of the links compensates for the opposing direction of arc or swing of the links and provides for a free sliding action of the door within the channels of the vertical guideways, aided by the wide flanged rims of the door sides.

The rim of the door is of sufficient stability to prevent any outward bowing or bulging of the portion of the panel above the discharge opening from any pressure imposed thereagainst by the load contents carried in the box of the body. The door structure permits an excessive width of discharge opening, ample for the discharge of farm or agricultural commodities, carried by the body, to the elimination of a full body width swinging gate which would materially increase the cost of the vehicle body, and recognizing that the body may be equipped with mechanism for tilting the same to an inclined position for discharging the contents.

Having described my invention, I claim:

A sheet metal panel for a wall of a box type of vehicle body vertically removably sustained upon the platform of the body, having a discharge opening therein from its lower end short of the heighth of the panel and guideways; one respectively at each of the opposite sides of the opening and in parallelism therewith for slidably mounting a door upon the panel as a closure for the opening, a sheet metal door having a ridge longitudinally of the lower end thereof terminating with a lateral flange for the base of the door, the ridge projecting from the inner side of the door to overlie and bear upon the body platform in the closed position of the door and alternately to bear against the edge of the panel for the upper end of the opening to withhold door withdrawal in the direction of movement to uncover the opening, and a stud bolt fixed to and projecting therefrom centrally thereof and toward its lower end and a pair of links, at one end in intersecting arrangement pivotally and slidably connecting with said stud bolt and extending in opposite directions cross-wise of and beyond the opposite sides of the door, with the outer ends pivotally mounted upon the panel, the slidable connection of the links with said stud bolt being of a degree to confine the movement of the door within the heighth dimension of the panel and the stud bolt adapted for clamping the links at their intersection to lock the same and the door at their limits of movement and any point therebetween.

HENRY E. KRUGER.

REFERENCES CITED

The following references are of record in the file of this patent:

UNITED STATES PATENTS

| Number | Name | Date |
|---|---|---|
| 257,329 | Holly | May 2, 1882 |
| 692,039 | Thorpe | Jan. 28, 1902 |
| 904,133 | Kennedy | Nov. 17, 1908 |
| 1,150,961 | Pederson | Aug. 24, 1915 |
| 1,220,183 | Cappel | Mar. 27, 1917 |
| 1,356,880 | Newton | Oct. 26, 1920 |
| 1,552,492 | Mills | Sept. 8, 1925 |
| 1,765,204 | Card | June 17, 1930 |
| 1,883,473 | Barrett | Oct. 18, 1932 |
| 2,122,014 | Stellner | June 28, 1938 |